(12) United States Patent
Buitron et al.

(10) Patent No.: US 7,168,153 B2
(45) Date of Patent: Jan. 30, 2007

(54) METHOD FOR MANUFACTURING SINGLE-SIDED HARD MEMORY DISKS

(75) Inventors: Gerardo Buitron, San Jose, CA (US); Walter Crofton, Castro Valley, CA (US); Bruce Hachtmann, San Martin, CA (US); David Newman, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 325 days.

(21) Appl. No.: 10/435,362

(22) Filed: May 9, 2003

(65) Prior Publication Data

US 2004/0068862 A1    Apr. 15, 2004

Related U.S. Application Data

(60) Provisional application No. 60/417,632, filed on Oct. 10, 2002.

(51) Int. Cl.
  *G11B 5/127*    (2006.01)
  *H04R 31/00*    (2006.01)

(52) U.S. Cl. ............... 29/603.04; 29/90.01; 29/603.03; 29/604; 206/710; 206/711; 206/712; 428/64.1; 428/156; 428/303; 428/367; 428/922; 360/135

(58) Field of Classification Search ............... 29/90.01, 29/603.03, 603.04, 604; 206/710–712, 454; 428/64.1, 156, 34.1, 35.7, 303, 367, 922; 360/135
See application file for complete search history.

(56) References Cited

U.S. PATENT DOCUMENTS

| | | | |
|---|---|---|---|
| 3,382,647 A | 5/1968 | Davey et al. | |
| 3,505,777 A | 4/1970 | Tsutsumi | 53/168 |
| 4,573,851 A | 3/1986 | Butler | 414/404 |
| 4,669,612 A | 6/1987 | Mortensen | 206/454 |
| 4,676,008 A | 6/1987 | Armstrong | 34/237 |
| 4,694,778 A | 9/1987 | Learn et al. | 118/728 |
| 4,695,217 A | 9/1987 | Lau | 414/404 |
| 4,724,963 A | 2/1988 | Mortensen | 206/454 |
| 4,768,328 A | 9/1988 | Mims | 53/532 |
| 4,819,579 A | 4/1989 | Jenkins | 118/728 |

(Continued)

FOREIGN PATENT DOCUMENTS

EP    0 177 073    8/1985

(Continued)

OTHER PUBLICATIONS

"Design of an active memory system for network applications"; Asthana, A.; Cravatts, M.; Krzyzanowski, P.; Memory Technology, Design and Testing, Aug. 8-9, 1994; pp. 58-63.*

(Continued)

*Primary Examiner*—Paul D. Kim
(74) *Attorney, Agent, or Firm*—Sheridan Ross P.C.

(57) ABSTRACT

Various apparatus and methods are provided for positioning and handling single-sided hard memory disks. A disk carrier is provided with ribs formed on the inside surface of opposing side walls. The ribs form disk receiving grooves or channels. The ribs further comprise an alternating pattern of large and small ribs. The large ribs separate pairs of disks from other pairs, the small ribs separate and maintain spacing of the two disks comprising each pair of disks.

19 Claims, 8 Drawing Sheets

U.S. PATENT DOCUMENTS

| | | | | |
|---|---|---|---|---|
| 4,840,530 A | 6/1989 | Nguyen | ................ | 414/404 |
| 4,856,957 A | 8/1989 | Lau et al. | ................ | 414/404 |
| 4,947,624 A | 8/1990 | Cones, Sr. et al. | ................ | 53/540 |
| 4,947,784 A | 8/1990 | Nishi | ................ | 414/404 |
| 4,949,848 A | 8/1990 | Kos | ................ | 211/41 |
| 4,958,982 A | 9/1990 | Champet et al. | ................ | 414/751.1 |
| 4,962,879 A * | 10/1990 | Goesele et al. | ................ | 438/455 |
| 4,981,222 A | 1/1991 | Lee | ................ | 211/41 |
| 4,987,407 A | 1/1991 | Lee | ................ | 340/540 |
| 5,007,788 A | 4/1991 | Asano et al. | ................ | 414/416.09 |
| 5,111,936 A | 5/1992 | Kos | ................ | 206/334 |
| 5,125,784 A | 6/1992 | Asano | ................ | 414/404 |
| 5,188,499 A | 2/1993 | Tarng et al. | ................ | 414/404 |
| 5,269,643 A | 12/1993 | Kodama et al. | ................ | 414/416 |
| 5,314,107 A | 5/1994 | D'Aragona et al. | ................ | 228/116 |
| 5,348,151 A | 9/1994 | Dressen | ................ | 206/334 |
| 5,430,992 A | 7/1995 | Olson | ................ | 53/399 |
| 5,476,176 A | 12/1995 | Gregerson et al. | ................ | 206/711 |
| 5,486,134 A | 1/1996 | Jones et al. | ................ | 451/209 |
| 5,501,568 A | 3/1996 | Ono | ................ | 414/417 |
| 5,620,295 A | 4/1997 | Nishi | ................ | 414/416.11 |
| 5,664,407 A | 9/1997 | Cooper, III et al. | ................ | 53/542 |
| 5,780,127 A | 7/1998 | Mikkelsen | ................ | 428/35.7 |
| 5,820,449 A | 10/1998 | Clover | ................ | 451/287 |
| 5,906,469 A | 5/1999 | Oka et al. | ................ | 414/416 |
| 5,956,317 A * | 9/1999 | Komiyama et al. | ................ | 369/286 |
| 5,976,255 A | 11/1999 | Takaki et al. | ................ | 118/500 |
| 6,033,522 A | 3/2000 | Iwata et al. | ................ | 156/345 |
| 6,107,599 A | 8/2000 | Baumgart et al. | ................ | 219/121.77 |
| 6,182,814 B1 | 2/2001 | Koehler | ................ | 198/418.7 |
| 6,230,891 B1 | 5/2001 | Usui et al. | | |
| 6,345,947 B1 | 2/2002 | Egashira | ................ | 414/225.01 |
| 6,354,794 B2 | 3/2002 | Sato et al. | ................ | 414/811 |
| 6,368,040 B1 | 4/2002 | Yamasaki et al. | ................ | 414/222 |
| 6,427,850 B2 | 8/2002 | Mendiola | ................ | 211/41.18 |
| 6,457,929 B2 | 10/2002 | Sato et al. | ................ | 414/404 |
| 6,582,279 B1 | 6/2003 | Fox et al. | ................ | 451/37 |
| 6,612,801 B1 | 9/2003 | Koguchi | ................ | 414/416.02 |
| 6,625,835 B1 | 9/2003 | Frost et al. | ................ | 15/77 |
| 6,626,744 B1 | 9/2003 | White et al. | ................ | 451/66 |
| 6,769,855 B2 | 8/2004 | Yokomori et al. | ................ | 414/416.02 |
| 2002/0006324 A1 | 1/2002 | Sato et al. | ................ | 414/416.12 |
| 2003/0208899 A1 | 11/2003 | Grow et al. | ................ | 29/458 |
| 2003/0209389 A1 | 11/2003 | Buitron et al. | ................ | 184/6 |
| 2003/0209421 A1 | 11/2003 | Buitron et al. | ................ | 204/192.2 |
| 2003/0210498 A1 | 11/2003 | Kim et al. | ................ | 360/135 |
| 2003/0211275 A1 | 11/2003 | Buitron et al. | ................ | 428/64.1 |
| 2003/0211361 A1 | 11/2003 | Kim et al. | ................ | 428/694 R |
| 2004/0013011 A1 | 1/2004 | Valeri | ................ | 365/200 |
| 2004/0016214 A1 | 1/2004 | Buitron | ................ | 53/474 |
| 2004/0035737 A1 | 2/2004 | Buitron et al. | ................ | 206/454 |
| 2004/0069662 A1 | 4/2004 | Buitron et al. | ................ | 206/307.1 |
| 2004/0070092 A1 | 4/2004 | Buitron et al. | ................ | 264/1.33 |
| 2004/0070859 A1 | 4/2004 | Crofton et al. | ................ | 360/1 |
| 2004/0071535 A1 | 4/2004 | Crofton et al. | ................ | 414/416.09 |

FOREIGN PATENT DOCUMENTS

| | | | |
|---|---|---|---|
| EP | 0 192 244 | 2/1986 | |
| EP | 768704 | 4/1997 | ............ 414/416.02 |
| JP | 7-263521 | 10/1995 | ............ 414/416.02 |
| JP | 08273210 | 10/1996 | |
| JP | 2001232667 | 8/2001 | |
| WO | WO 9836867 A1 * | 8/1998 | |

OTHER PUBLICATIONS

Australian Written Opinion and Search Report, Dec. 17, 2004, Singapore Application No. SG200302857-8.

Mar. 12, 2005 invitiation to Respond to Written Opinion from Intellectual Property Office of Singapore to Tan Jinhwee, Eunice & Lim Chooeng.

US 5,762,201, 06/1998, Whalen (withdrawn)

* cited by examiner

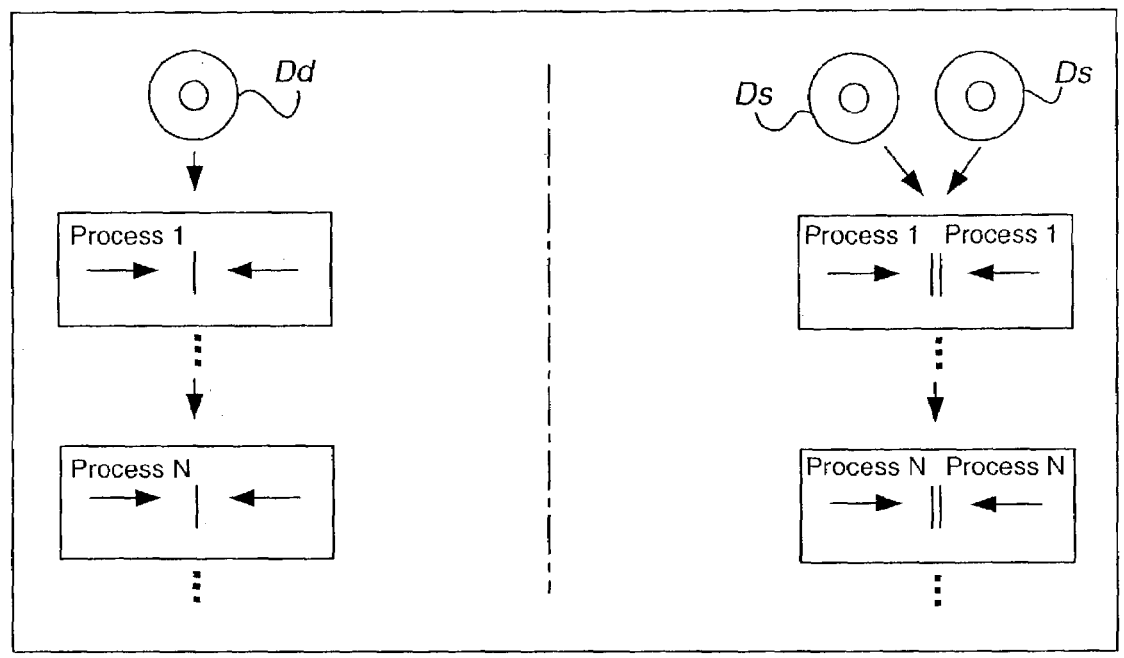
FIG. 1
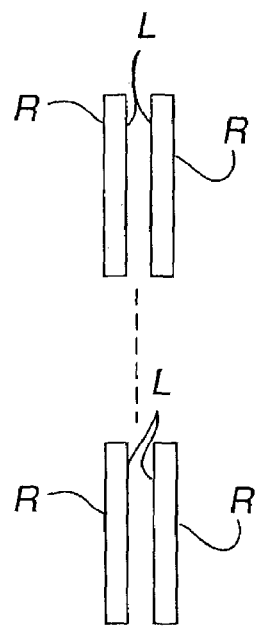   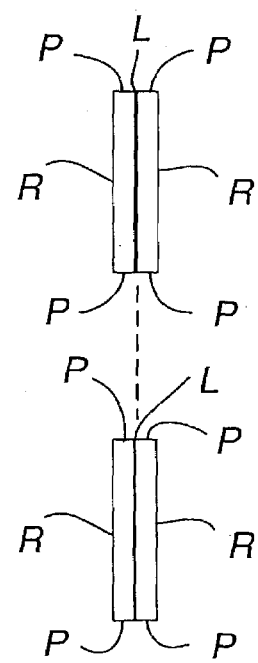   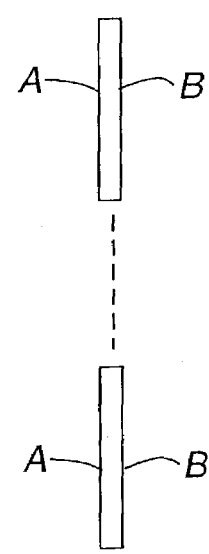
FIG. 2   FIG. 3   FIG. 4

METHOD FOR MANUFACTURING SINGLE-SIDED HARD MEMORY DISKS

CROSS REFERENCE TO RELATED APPLICATION

Priority is claimed from U.S. Provisional Patent Application Ser. No. 60/417,632 filed Oct. 10, 2002, which is incorporated by reference herein in its entirety.

The subject matter of the present application is related to the following applications, each of which has a filing date of May 9, 2003: application Ser. No. 10/434,550 entitled Single-Sided Sputtered Magnetic Recording Disks to Clasara et al. (Publication No. US-2003-0211361-A1); application Ser. No. 10/435,361 entitled Dual Disk Transport Mechanism Processing Two Disks Tilted Toward Each Other to Grow et al. (Publication No. US-2003-0208899-A1); application Ser. No. 10/435,358 entitled Information-Storage Media With Dissimilar Outer Diameter and/or Inner Diameter Chamfer Designs On Two Sides to Clasara et al. (Publication No. US-2003-0210498-A1); application Ser. No. 10/435,360 entitled Method of Merging Two Disks Concentrically Without Gap Between Disks to Buitron (Publication No. US-2004-0016214-A1); application Ser. No. 10/434,551 entitled Apparatus for Combining or Separating Disk Pairs Simultaneously to Buitron et al. (Publication No. US-2004-0035737-A1); application Ser. No. 10/435,572 entitled Method of Simultaneous Two-Disk Processing of Single-Sided Magnetic Recording Disks to Buitron et al. (Publication No. US-2003-0211275-A1); application Ser. No. 10/435,161 entitled W-Patterned Tools for Transporting/Handling Pairs of Disks to Buitron et al. (Publication No. US-2003-0209421-A1); application Ser. No. 10/435,295 entitled Method for Servo Pattern Application on Single-Side Processed Disks in a Merged State to Valeri (Publication No. US-2004-0013011-A1); application Ser. No. 10/434,547 entitled Method for Simultaneous Two-Disk Texturing to Buitron et al. (Publication No. US-2004-0070092-A1); application Ser. No. 10/435,227 entitled Cassette for Holding Disks of Multiple Form Factors to Buitron et al. (Publication No. US-2004-0069662-A1); application Ser. No. 10/434,546 entitled Automated Merge Nest for Pairs of Magnetic Storage Disks to Crofton et al. (Publication No. US-2004-0071535-A1); application Ser. No. 10/435,293 entitled Apparatus for Simultaneous Two-Disk Scrubbing and Washing to Crofton et al. (Publication No. US-2004-0070859-A1); and application Ser. No. 10/434,540 entitled Method of Lubricating Multiple Magnetic Storage Disks in Close Proximity to Buitron et al. (Publication No. US-2003-0209389-A1). Each of these applications is incorporated by reference in its entirety as if stated herein. All of these applications are commonly owned by the Assignee.

FIELD OF THE INVENTION

The present invention relates to the processing of hard memory disks, typically used in hard disk drives. More specifically, it relates to the handling and transport of pairs of single-sided hard memory disks.

BACKGROUND OF THE INVENTION

Hard disk drives are an efficient and cost effective solution for data storage. Depending upon the requirements of the particular application, a disk drive may include anywhere from one to eight hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

Typically, hard memory disks are produced with functional magnetic recording capabilities on both sides or surfaces of the disk. In conventional practice, these hard disks are produced by subjecting both sides of a raw material substrate disk, such as glass, aluminum or some other suitable material, to numerous manufacturing processes. Active materials are deposited on both sides of the substrate disk and both sides of the disk are subject to full processing such that both sides of the disk may be referred to as active or functional from a memory storage stand point. The end result is that both sides of the finished disk have the necessary materials and characteristics required to effect magnetic recording and provide data storage. These are generally referred to as double-sided process disks. Assuming both surfaces pass certification testing and have no defects, both sides of the disk may be referred to as active or functional for memory storage purposes. These disks are referred as double-sided test pass disks. Double-sided test pass disks may be used in a disk drive for double-sided recording.

Conventional double-sided processing of hard memory disks involves a number of discrete steps. Typically, twenty-five substrate disks are placed in a plastic cassette, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding, in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing. Washing is a multi-stage process and usually includes scrubbing of the disk surfaces. The textured substrate disks are then subjected to a drying process. Drying is performed on an entire cassette of disk drives at a time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied. The lubrication process can be accomplished by subjecting an entire cassette of disks to a liquid lubricant; it does not need to be done one disk at a time. Following lubrication, the disks are individually subjected to surface burnishing to remove asperities, enhance bonding of the lubricant to the disk surface and otherwise provide a generally uniform finish to the disk surface. Following burnishing, the disks are subjected to various types of testing. Examples of testing include glide testing to find and remove disks with asperities that could affect flying at the head/slider assembly and certification testing which is writing to and reading from the disk surfaces. Certification testing is also used to locate and remove disks with defects that make the surface unuseable for data storage. The finished disks can then be subjected to a servo-writing process and placed in disk drives, or placed in disk drives then subjected to servo-writing. The data zone texturing, laser zone texturing, scrubbing, sputtering, burnishing and testing processes are done one disk at a time, with each surface of a single disk being processed simultaneously.

Although the active materials and manufacturing processes, by their nature, are difficult and expensive to employ, over the years, the technology used to manufacture hard memory disks has rapidly progressed. As a result, the density of information that can be stored on a disk surface is remarkable. Indeed, double-sided test pass disks used in personal computers have much greater storage capacity than most consumers require during the useful life of the computer. Consumers thus are forced to pay substantial amounts for excess storage capacity and the components to access the excess storage capacity. This has caused some disk drive manufacturers, in some current applications, to manufacture and sell disk drives which utilize only one side of a double-sided test pass disk for storage purposes or which use the good side of a double-sided process disk where one surface passed certification testing and the second surface failed. In either case, the second surface, despite being fully processed, is unused. However, the disk drive manufacturer reduces its cost by eliminating the mechanical and electrical components needed to access the unused disk surface. These disk drives are referred to as single-side drives and are typically used in low-end or economy disk drives to appeal to the low cost end of the marketplace. Although this approach may reduce some cost, it does not reduce the wasted cost of manufacturing the unused storage surface of each disk. Thus, substantial savings can be achieved by not only manufacturing disks with a single active or functional side, but doing so in a cost-effective manner.

In contrast to a double-sided disk, a single-sided disk has only one functional memory surface with active recording materials. It is not a double-sided process disk where one side is not accessed or where one side has failed testing. Rather, manufacturing processes are applied in a controlled manner only to one side of the disk using unique single-sided processing techniques. In contrast to conventional double-sided disks, active recording materials are only applied to, and full processing is only conducted on, one side of the disk. Thus, substantial savings are achieved by eliminating processing the second side of each disk.

Additionally, the present invention achieves advantages by utilizing conventional double-sided disk manufacturing equipment and processes, with limited modification. The present invention enables simultaneous processing of two substrate disks through the same equipment and processes used to manufacture double-sided disks. Simultaneously processing two substrate disks results in the production of two single-sided disks in the same time and using essentially the same equipment as currently is used in the production of one double-sided disk. However, each single-sided disk has only a single active or functional surface. For illustrative purposes FIG. 1 shows a side-by-side schematic representation of the processing of one double-sided disk $D_d$, depicted on the left side of FIG. 1, versus the simultaneous processing of two single-sided disks $D_s$, depicted on the right side of FIG. 1. In each case, the double-sided disk or the two single-sided disks are subjected to the same process steps 1 through N, but the single-sided disk processing produces two disks in the same time the double-sided disk processing produces one disk.

A benefit provided by simultaneous single-sided processing of disks is a substantial cost savings achieved by eliminating the application of materials to and processing of one side of each disk. A further, and potentially significant cost savings can be achieved by utilizing existing double-sided disk processing equipment, with limited modification, to process pairs of single-sided disks. A still further benefit is a substantial increase in production (or reduction in processing time depending upon perspective). By utilizing existing double-sided disk processing equipment, approximately twice the productivity of a conventional double-sided production process is achieved (on the basis of numbers of disks produced) in the production of single-sided disks. Moreover, these increased productivity levels are achieved at approximately the same material cost, excepting the substrate disk, as producing half as many double-sided disks.

The simultaneous processing is achieved by combining two substrate disks together into a substrate disk pair or disk pair. A disk pair is two substrate disks that are oriented in a back-to-back relationship with the back-to-back surfaces either in direct physical contact or closely adjacent with a slight separation. The separation can be achieved with or without an intervening spacer. The substrate disk pair progresses through each process step in much the same way as one double-sided disk, but with only the outwardly facing surface of each disk in the pair being subjected to the full process. Thus, the outwardly facing surface of each pair becomes the active or functional surface and the inwardly facing surface of each pair remain inactive or non-functional.

For convenience and understanding, the following terms will have the definitions set forth:
  a) "R-side" and "L-side" refer to the active side and inactive side of a disk, respectively. R-side is the side that does or will have active recording materials and memory capability. The R-side may also be referred to as the active or functional side. The L-side is the side that has little or no active recording materials or memory capabilities; it is non-functional or inactive from a data storage stand point.
  b) "Merge" means to bring two disks closer together to form a pair of disks, a disk pair or a substrate pair.
  c) "Demerge," conversely, means that a merged pair of disks is separated from each other.

d) "Disk" means a finished memory disk and all predecessor configurations during the manufacturing process starting with a substrate disk and progressing to a finished memory disk, depending upon the context of the sentence in which it is used.

e) "Disk pair" or "substrate pair" means two disks positioned in contact merge, gap merge or spacer merge orientation.

f) "Double-sided disk" means a single disk which has been subjected to double-sided processing, whether or not both sides of the disk have passed testing or only one side has passed testing.

g) "Gap merge" means a pair of disks that have been merged, but a space is maintained between the two merged disks. One or more spacers may or may not be used to maintain the gap or space. Gap merge includes both concentric and non-concentric merge. It should be understood that there is no precise dimension or limit to the space between the disks that causes them to be gap merged. Gap merge also includes the situation where the gap between the disks gradually decreases from one perimeter edge to the opposite perimeter edge of the disks when the two disks are angled toward each other. An example is when the bottom perimeter edges of the disks are spaced apart and the upper perimeter edges are in contact.

h) "Single-sided disks" means a single disk which has been subjected to single-side processing, where only one surface of the disk is fully processed.

i) "Spacer merge" means a spacer body is used to create spacing between two gap-merged disks.

j) "Contact merge" means a merged pair of disks where the inside surface of each disk is in contact with the inside surface of the other disk. Contact merge includes concentric and non-concentric merge.

k) "Concentric merge" means that two merged disks have the same axis and, assuming the two disks have the same outside diameter and inside diameter (as defined by the center aperture), their outer and inner perimeter edges are aligned.

l) "Concentric contact merge" means a pair of disks that are oriented in both a contact merge and a concentric merge.

m) "Non-concentric merge" or "off-centered merge" means the two merged disks are not concentric to each other or their perimeter edges are not aligned.

n) "Non-concentric contact merge" means the two contact merged disks are not concentric to each other or their perimeter edges are not aligned.

Referring to FIG. 2, a cross-section of a pair of gap-merged disks is shown. The R-side (active or functional side) is the outwardly facing surface R of each disk within the pair. The L-side (inactive or nonfunctional side) is the inwardly facing surface L of each disk within the pair. In comparison, a cross-section of a pair of concentric contact merged disks is shown in FIG. 3. The relative orientation of the R-side and L-side of each disk remains the same, however, the L-side of each disk of the pair are in contact and the outer and inner perimeter P of each disk is aligned with the outer and inner perimeter P of the other disk.

A conventional double-sided disk is shown in FIG. 4. The left side surface is referred to as the "A" side and the right side surface is referred to as the "B" side. Both the A and B sides are subjected to processing, including the addition of active or magnetic materials. In contrast, with reference to FIGS. 2 and 3, the R-side of each disk in a pair of disks is oriented on the outside of the pair and is subjected to processing in the same fashion as the A and B sides of a double-sided disk. Conversely, the L-side of each disk in a pair of disks is oriented on the inside of the pair and is not subjected to full processing in the same fashion as the A and B sides of a double-sided disk.

SUMMARY OF THE INVENTION

These and other benefits are addressed by the various embodiments and configurations of the present invention. For example, the benefit provided by the present invention is an increased output in the production of finished disks using conventional double-sided disk manufacturing processes, but with multiple pairs of single-sided disks. A cassette is provided which positions the disks in pairs in a gap merge orientation. Gap merge orientation is the preferred positioning of disk pairs for handling disk pairs in connection with numerous single-sided disk manufacturing processes. For example, in moving disk pairs within the data zone texturing process, the scrubbing and washing process, laser zone texturing processes and the sputtering process, it is preferable that the pairs be positioned in a gap merge orientation.

In one embodiment, the cassette is provided with an open top, open bottom and U-shaped openings in the end walls to permit access to the disks. The side walls of the cassette are uniquely configured to position the disks in pairs, in a gap merge orientation. Side walls include alternating large and small ribs which define vertical channels for holding the disks in pairs. The large ribs serve to separate pairs of disks, and the small ribs maintain desired spacing between disks of the same pair. The size and dimensions of the ribs may change to accommodate different sized disks.

BRIEF DESCRIPTION OF THE DRAWINGS

FIG. 1 is a schematic of a double-sided disk manufacturing process, on the left, and a schematic of a single-sided disk manufacturing process, on the right.

FIG. 2 is a cross-section of a pair of gap merge disks.

FIG. 3 is a cross-section of a pair of concentric contact merge disks.

FIG. 4 is a cross-section of a conventional double-sided process disk.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

The present method and apparatus for handling disks comprises a cassette or disk carrier which holds pairs of single sided disks in either a gap merge or contact merge orientation. Although the cassette may be constructed to hold any number of disks and most any size disk, the preferred embodiment and accompanying drawings address disks that are 95 millimeters in diameter and have a thickness of approximately 0.050 inches. The preferred embodiment of the cassette is also designed to position the disks in pairs in a single, axially aligned row. By positioning the disks in closely aligned pairs, the cassette doubles the capacity of a conventional double-sided hard disk manufacturing cassette within the same size cassette. For example, cassettes that handle double-sided disks typically hold 25 disks. The preferred embodiment of the present invention is designed to hold 25 pairs of disks, or 50 disks, in the same size cassette. Thus, the cassette of the present invention may be utilized with existing or current hard memory disk manufacturing tooling such as equipment for positioning, handling or moving the cassettes between different work stations and equipment for incrementally moving or indexing the cassette at any single work station.

Figure 5:
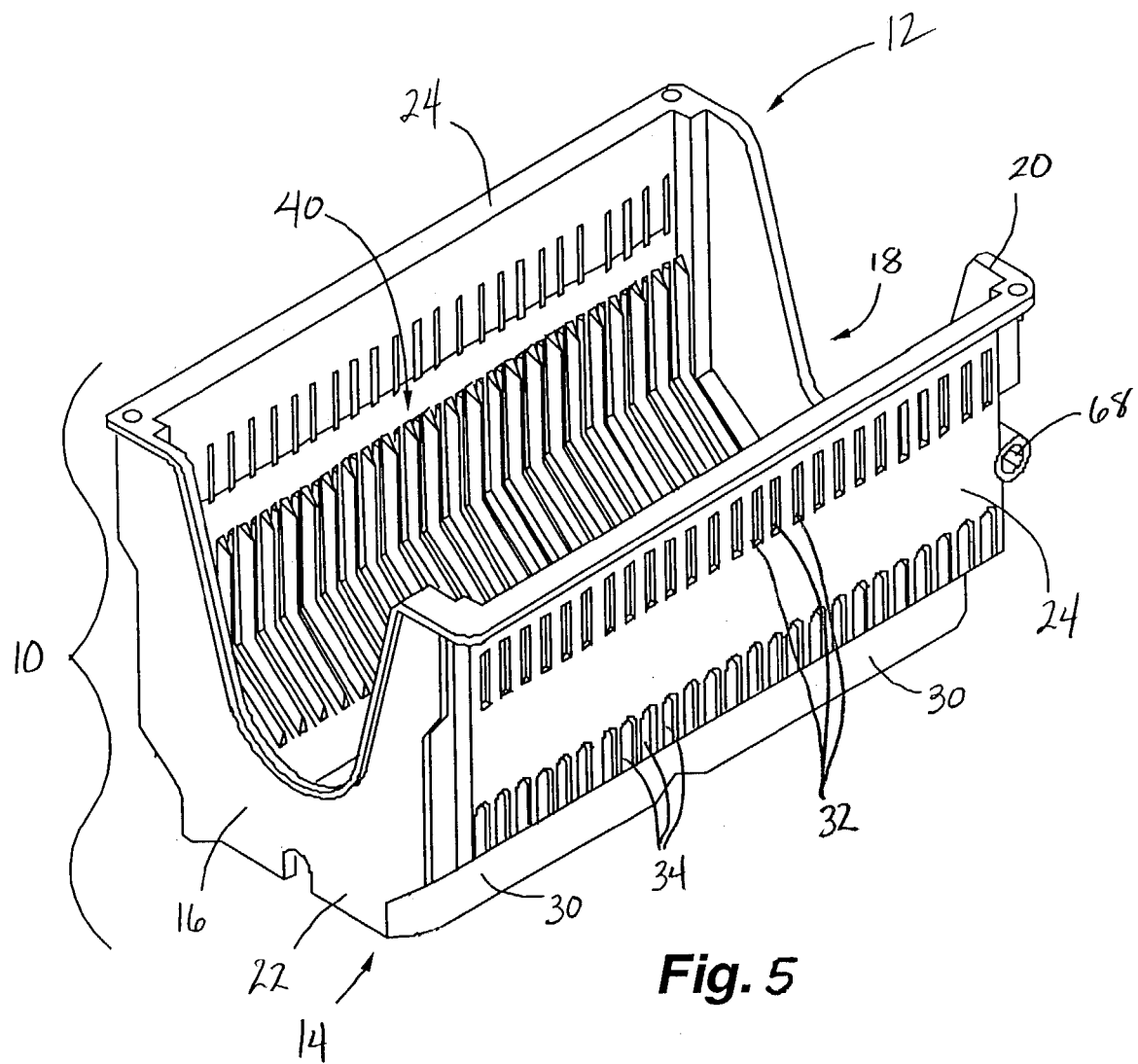
FIG. 5 is a perspective view of one embodiment of the present invention.
Figure 6:
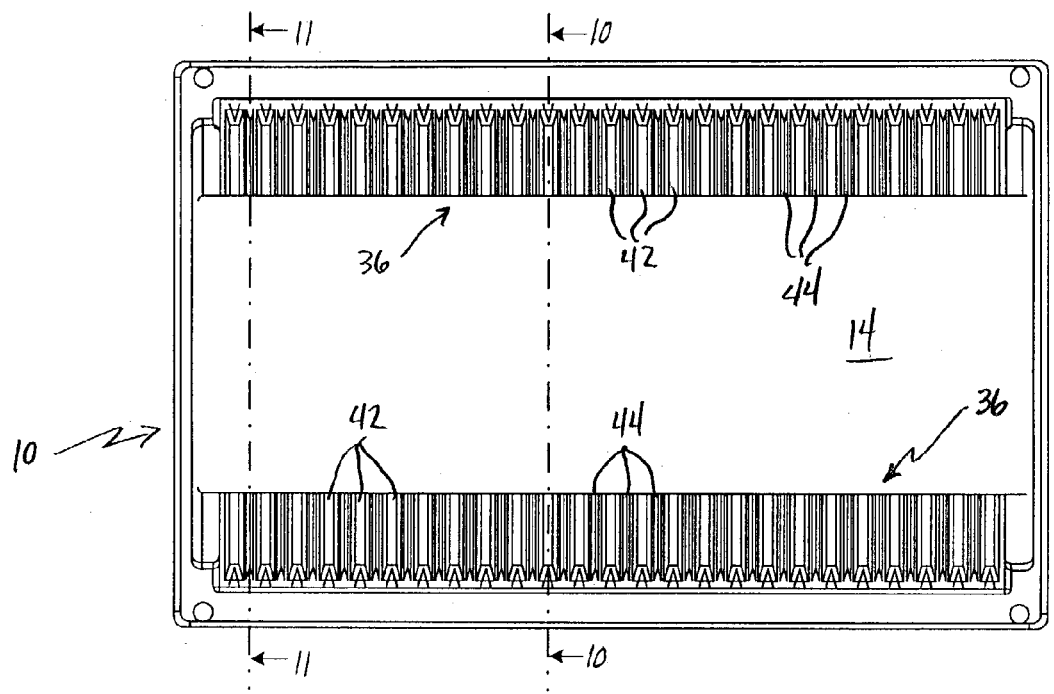
FIG. 6 is a top plan view of the embodiment of FIG. 5.
Figure 7:
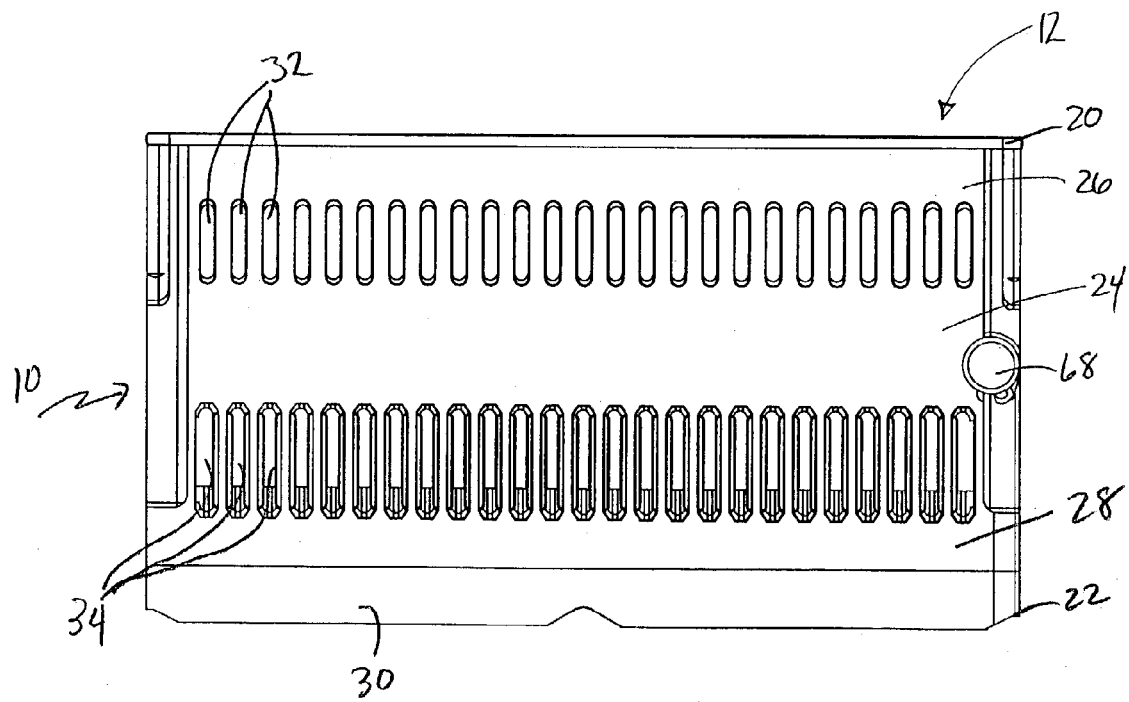
FIG. 7 is a side elevation view of the embodiment of FIG. 5.
Figure 8:
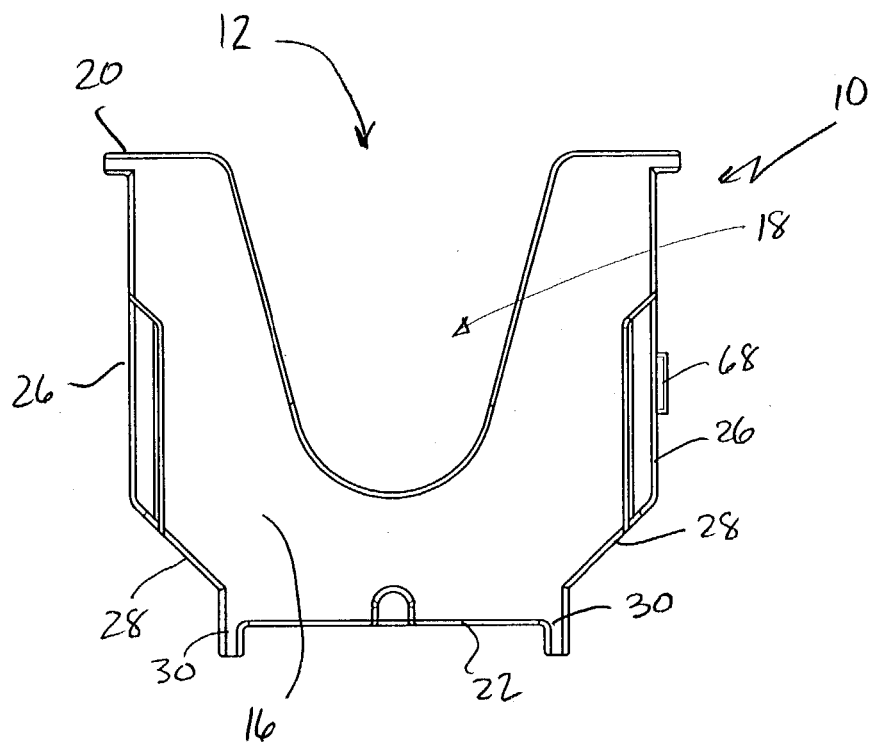
FIG. 8 is an end view of the embodiment of FIG. 5.

Turning to FIG. 5, one embodiment of the cassette 10 of the present invention is illustrated. The cassette has an open top 12 and open bottom 14. The cassette has two end walls 16 with a U-shaped opening 18 extending from the top edge 20 of the end wall toward the bottom edge 22. The side walls 24 comprise an upper portion 26, a lower portion 28 and a base portion 30. The upper portion 28 is substantially vertical, and the lower portion 28 angles inwardly from the upper side wall portion to the base portion 30. The lower portion 28 may be straight, as shown in FIGS. 7 and 8, or it may be curved to generally match the profile of the hard disks (not shown).

A series of vertical indexing slots or openings 32 are disposed along the upper side wall portion 26 to allow indexing and movement of the cassette relative to the various process machinery that comprises the disk manufacturing process. (See FIGS. 7, 11, 12.) For example, a cassette may be positioned at a specific station and disk pairs removed one pair at a time. As disks are removed and processed, the cassette is repositioned using the indexing slots. Similarly, the indexing slots can be used to align the cassette with processing equipment, such as a mandrel for engaging the disks along their center apertures or other types of equipment used to engage the outer edge of the disks. In the preferred embodiment, there are 25 indexing slots evenly spaced along the upper portion of each side wall which correspond to the location of 25 pairs of disks. The indexing may be accomplished with mechanical or optical feedback.

In addition, rows of slots 34 are disposed along the side walls at the junction of the upper side wall and lower side wall. These slots allow liquids used in the various processes to drain and escape from the cassette. For example, in some processes, such as data zone texturing, the entire cassette is submerged under water. The slots 34 allow the water to enter and escape from the cassette before the cassette is moved to the next work station.

Figure 10:
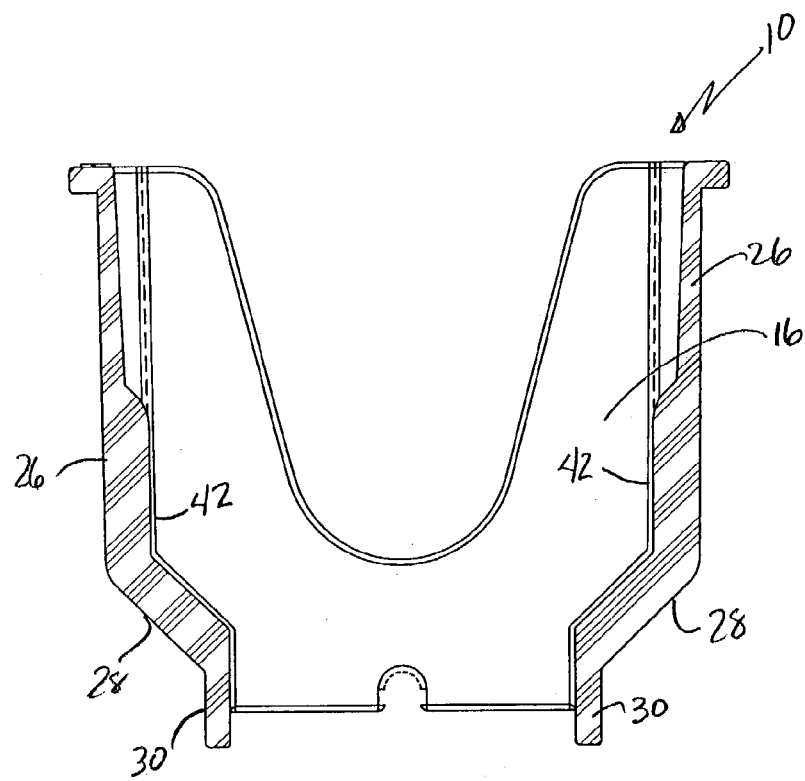
FIG. 10 is a cross-section taken along line 10—10 of FIG. 6.
Figure 11:
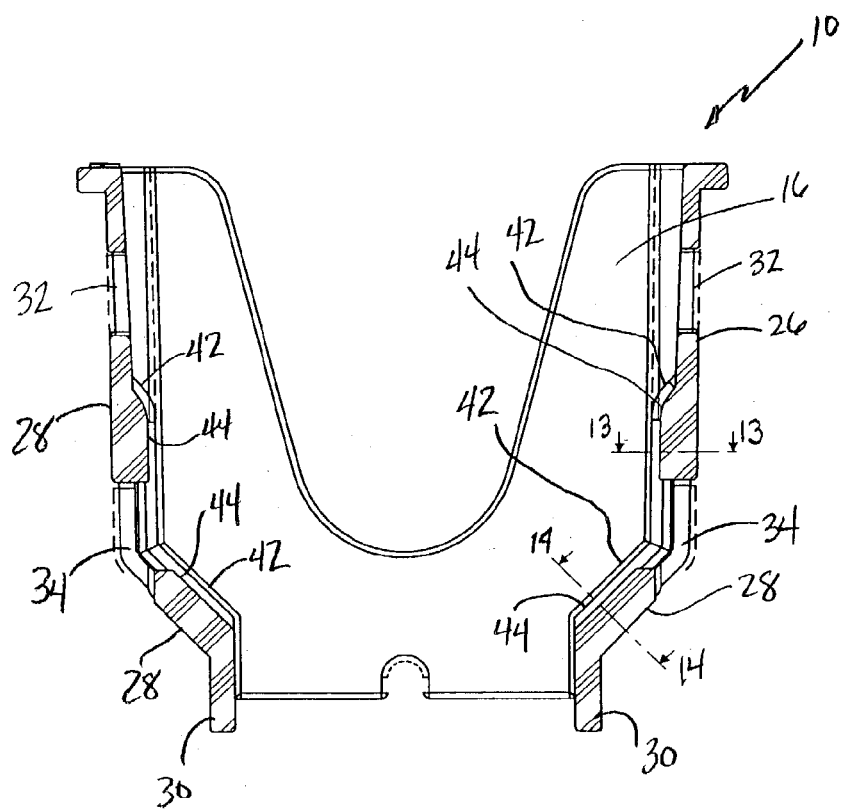
FIG. 11 is a cross-section taken along line 11—11 of FIG. 6.
Figure 14:
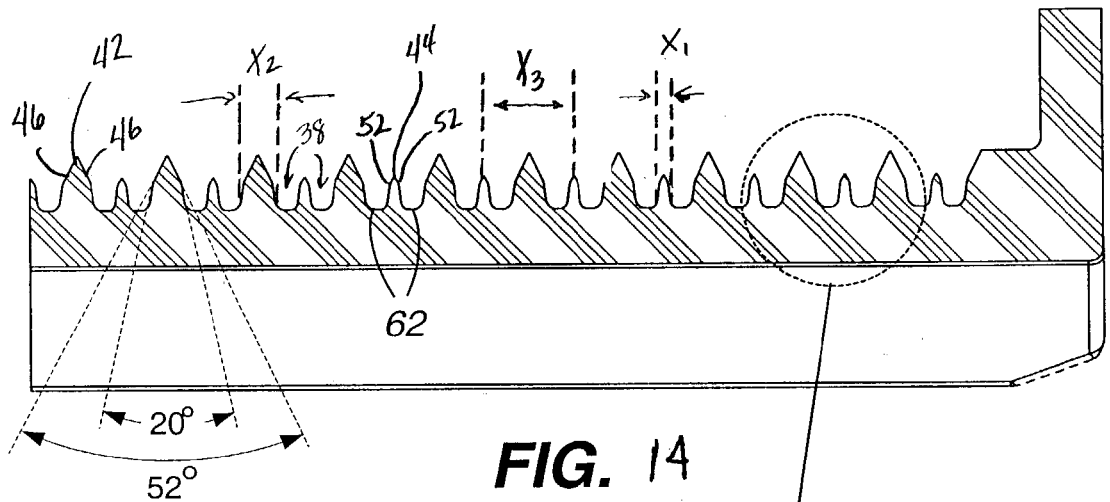
FIG. 14 is a partial cross-section taken along line 14—14 of FIG. 11.
Figure 15:
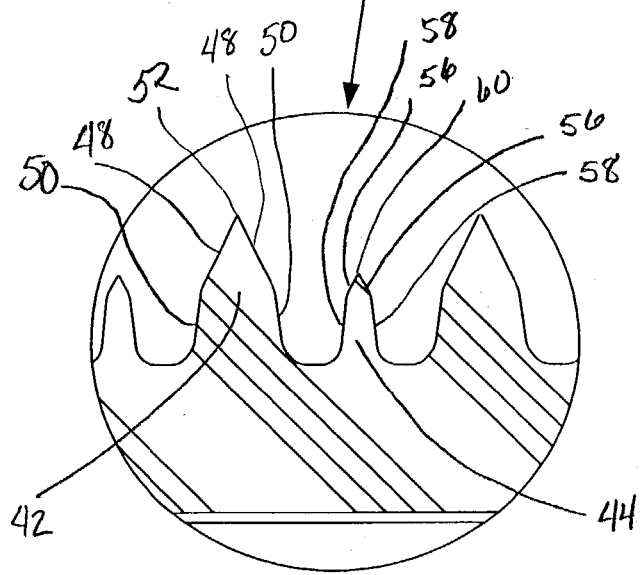
FIG. 15 is a partial exploded view taken from FIG. 14.
Figure 18:
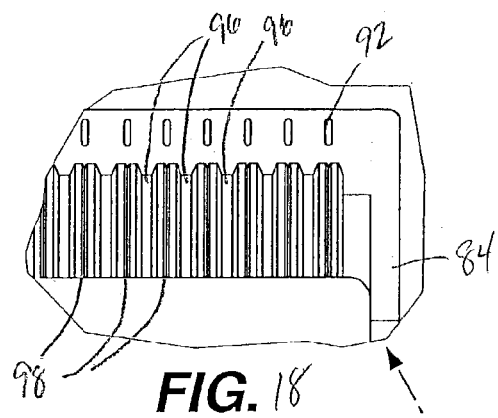
FIG. 18 is a partial exploded view taken from FIG. 17.
Figure 17:
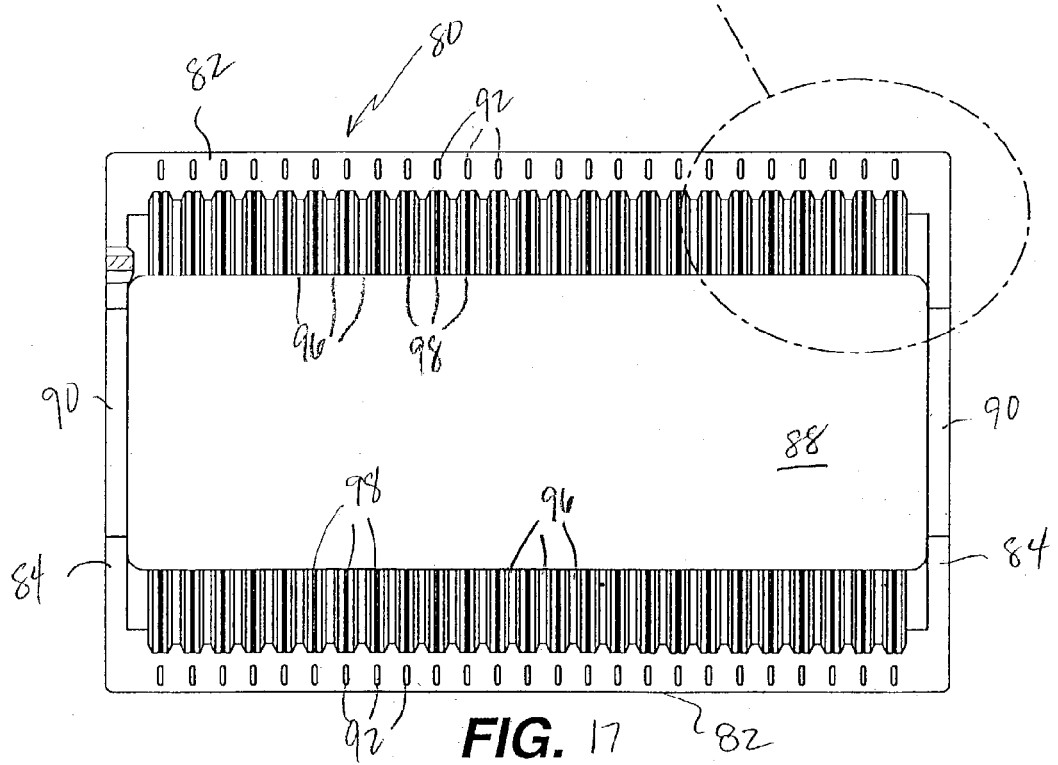
FIG. 17 is a top plan view of a second embodiment of the present invention.

Turning to FIGS. 6, 10, 11, 14 and 15, the inside surface 36 of the upper and lower portions 26, 28 of the side walls 24 comprise at least one row of grooves 38 for positioning disks in pairs and in gap merge orientation. The grooves may be formed by recessing channels in the side walls or by extending ribs or ribs 40 from the side walls, or perhaps by both. In the first embodiment, designed for pairs of gap merge disks, the ribs 40 alternate between large and small raised ribs 42, 44, respectively. The larger ribs 42 are disposed between and separate disk pairs. The larger ribs 42 have side walls 46 formed by two surfaces 48 and 50 joined at an obtuse angle. The side walls 46 merge to form a ridge 52. A single small rib 44 is disposed between consecutive large ribs 42. Like the large ribs, the small ribs also have side walls 54 formed by two surfaces 56, 58 joined at an obtuse angle. Surfaces 56 merge to form a raised ridge 60. The small ribs maintain the separation between the two disks comprising a disk pair. In the preferred embodiment, the spacing between a pair of gap merge disks ranges between 0.075 and 0.025 inches, and most preferably is 0.035 inches. In addition, as shown in FIG. 11, the large ribs 42 extend closer to the open top 12 than do the smaller ribs 44. As illustrated in FIGS. 14 and 15, the bottom surface 62 of each channel is substantially flat. Although, it should be appreciated that the channel may be V-shaped, with an apex at the bottom rather than a flat surface, provided the width of the V-shaped channel is sufficient to accommodate the width of a disk.

Figure 9:
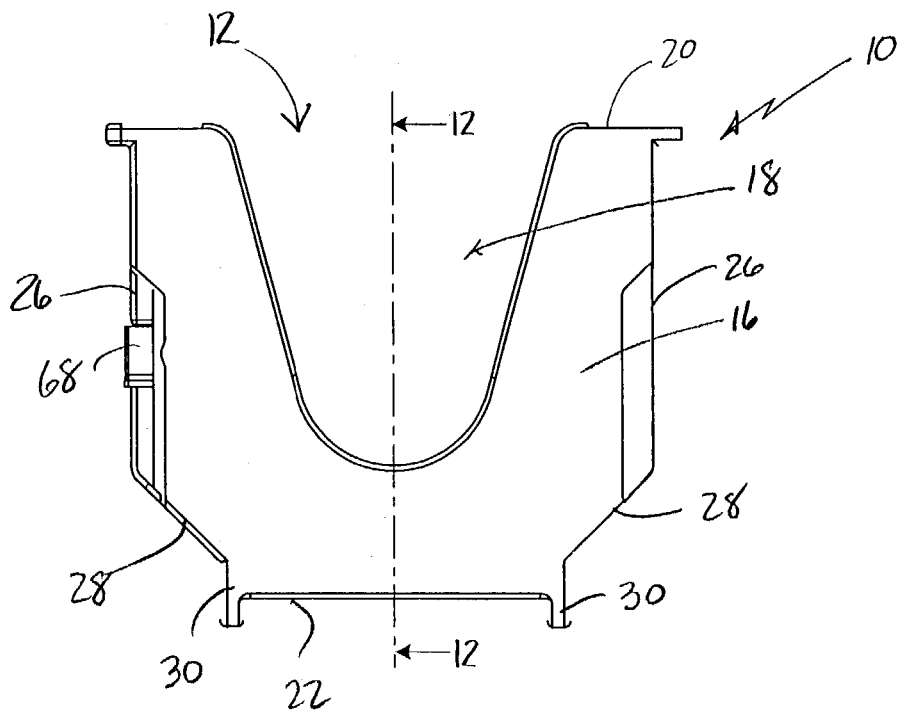
FIG. 9 is an end view of the opposite end of the embodiment of FIG. 5.

It is desirable to facilitate a smooth transfer of disks into the cassette 10. One way to accomplish this is to form various tapers in the configuration of the side wall 24 and the ribs 42 and 44. As illustrated in FIGS. 9 and 10, the opposed inside surface 36 of the side walls 24 gradually taper inwardly from the open top until the point where the large ribs 42 start. This allows disks to be partially lowered into the cassette prior to any interaction between the disks and the ribs 42, 44.

Figure 12:
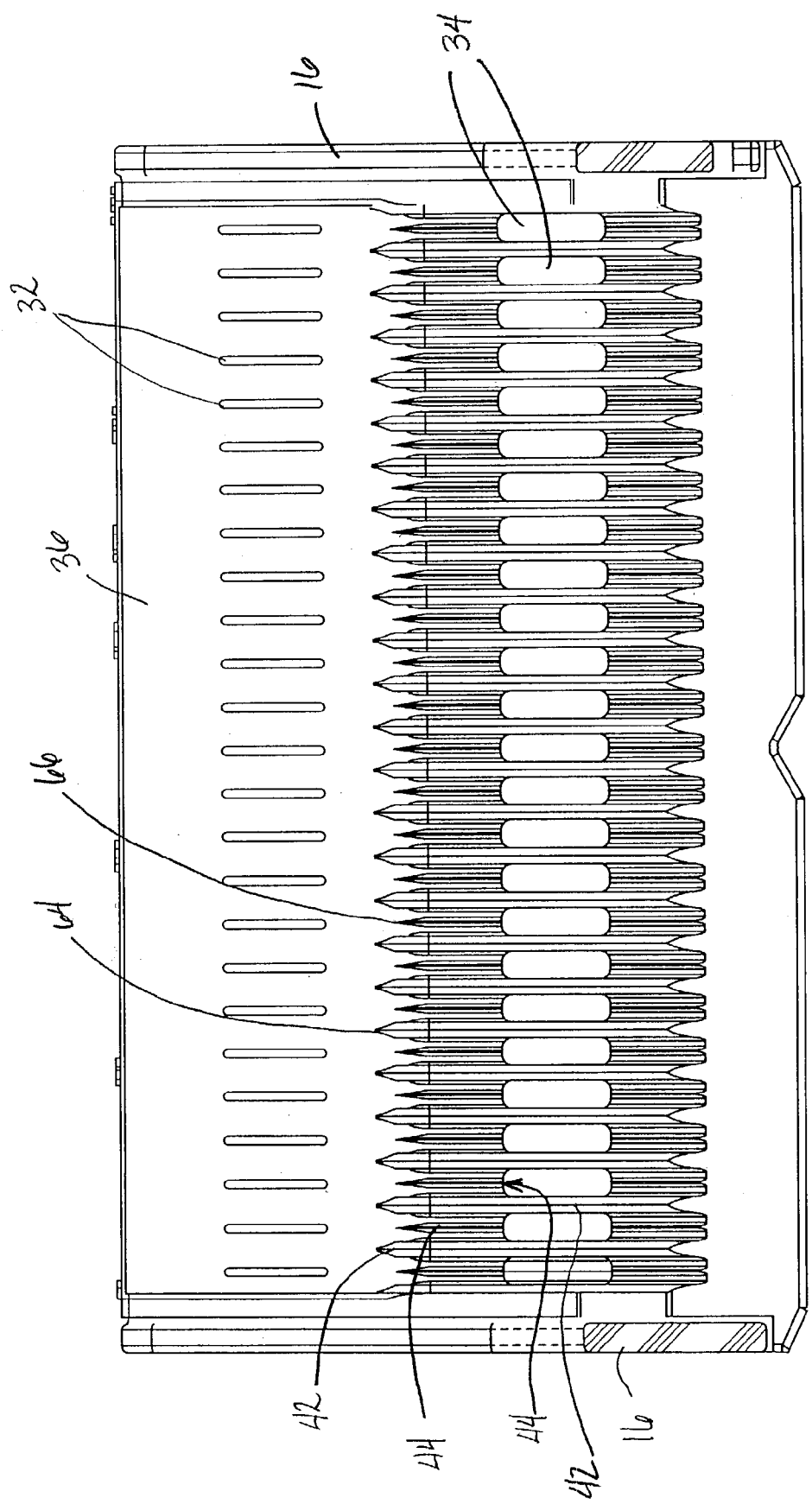
FIG. 12 is a cross-section taken along line 12—12 of FIG. 9.
Figure 13:
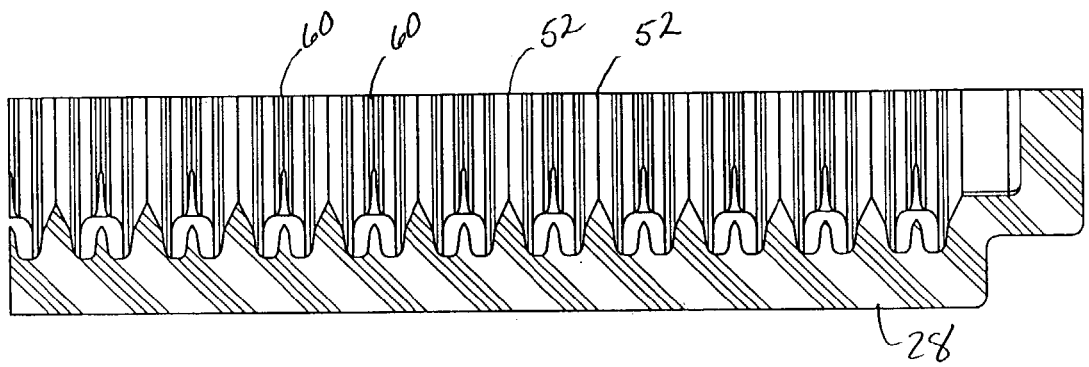
FIG. 13 is a partial cross-section taken along line 13—13 of FIG. 11.

Next, as the disks are lowered further into the cassette, two different tapers formed in the ribs 42, 44 will also facilitate a smooth transition into a gap merge orientation. The first taper is best illustrated in FIG. 12, where the upper or leading edge of each rib 42 and 44 is tapered to a point at 64 and 66, respectively. Thus, the leading edge 64 of the large ribs will initially segregate the disks into pairs by positioning two disks between adjacent large ribs before the disks interact with the small ribs 44. At the same time, the gap between each pair of disks will have narrowed. The narrowing of the gap between the disks will be further facilitated by the taper formed by the upper side wall surfaces 48 and lower side wall surfaces 50 of the large ribs 42, best seen in FIGS. 13 and 14. In one embodiment, the upper side wall surfaces form an angle of approximately 52 degrees which provides a wide opening to facilitate disk transition. The lower side walls 50 form an angle of approximately 20 degrees which also facilitates receiving the disks but also assists in limiting disk movement. In the same embodiment, the gap or distance between two disks of the same pair, or the width of a small rib 44, is 0.035 inches. The distance between the R-side of two adjacent disks of different pairs, or the thickness of a large rib 42, is 0.115 inches. The gap center-to-center distance, or the distance between the ridge of two adjacent small ribs, is 0.25 inches. It should be appreciated that based upon the thickness of the disks used, the edge-to-edge separation (gap separation) distance may vary between approximately 0.020 inches to 0.075 inches. Thus, the disks can be transitioned smoothly into the cassette 10 and maintained by the cassette as pairs of gap merge disks.

Figure 16:
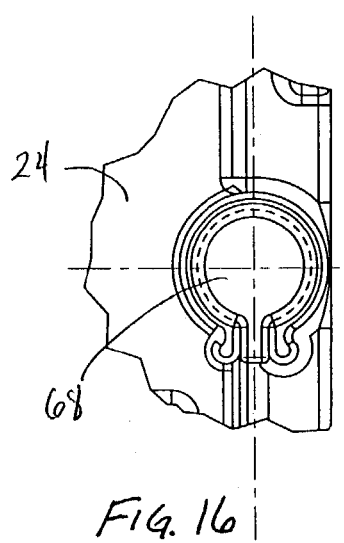
FIG. 16 is a partial exploded view of a cavity for a radio frequency identification tag.

The cassette may also include a tubular cavity 68, positioned at one end of the cassette. The cavity is designed to securably receive a radio frequency identification (RFID) tag which enables the cassette and its contents to be tracked by automated equipment. (FIGS. 9, 16.) Each RFID tag would contain its own unique identification number, different from all other cassettes. In this manner, a batch of disks can be tracked through the entire manufacturing process, and even on to the customer. The RFID tag could further include a read/write memory that would allow it to store confirmation of the completion of each process step which could be written to the chip by a transmitter associated with each process station. If defects were later discovered, it would also permit tracking down the location of other batches processed at the same time.

In the preferred embodiment, the cassette will be injection molded of suitable plastic, selected based upon the particular use of the cassette in the overall manufacturing process. One appropriate technique would be injection molding. High performance plastics, such as polybutylene terephthalate (PBT) could be used as it has acceptable strength and durability characteristics. Alternatively, polyesteresterketone (PEEK) may be used if the cassette will be used in a high temperature environment, such as sputtering where temperatures can reach 350 degrees Celsius. Other suitable high temperature plastics include plastics sold under the trade names Ultem and Vespel.

In a second embodiment, shown in FIGS. 17–20, the cassette is also configured for concentric contact merge orientation of disks. This particular embodiment is designed for use in the sputtering process. It is shorter in height than the embodiment shown in FIGS. 5–16, and is preferably made from metal to accommodate the elevated disk temperatures resulting from the high temperatures of the sputtering process. The cassette may be die cast or stamped. Due to the possible application in high temperature environments, appropriate metals include 304 or 316 stainless steel or aluminum, which can maintain integrity in high temperature environments and when holding high temperature disks. Although the temperatures in the sputtering chambers may reach 350 degrees Celsius, the disk temperatures in the cassettes do not typically exceed 270 degrees Celsius.

The cassette 80 has two side walls 82, two end walls 84, an open top 86 and an open bottom 88. The end walls have a U-shaped or semi-circular opening 90 to permit access to the center aperture of the disks. Indexing slots 92 are formed along the top of the side walls for positioning the cassette.

Figure 20:
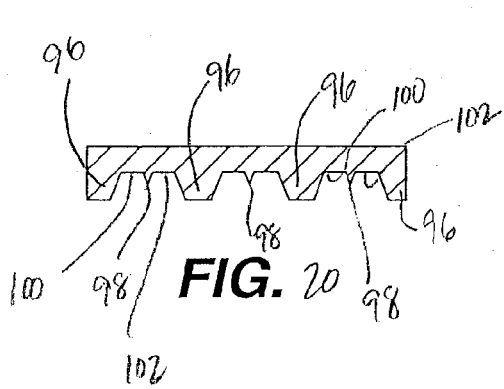
FIG. 20 is a partial cross-section of the disk supporting ribs of the inside wall of the embodiment of FIG. 17.
Figure 19:
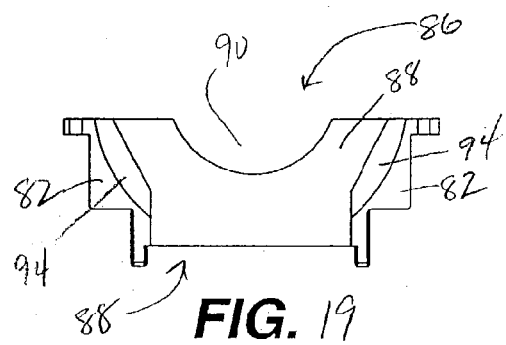
FIG. 19 is an end elevation view of the embodiment of FIG. 17.

In this second embodiment, the side walls are curved at 94 to correspond to the curvature of the disks and the inside surface of the side walls are configured with an alternating pattern of large ribs 96 and small ribs 98. As with the first embodiment, the ribs define a pair of side-by-side channels 100 and 102. As best seen in FIG. 20, the ribs 96 separate pairs of disks and the ribs 98 maintain the gap between the two disks of each pair. The size of the ribs and dimensions of the gaps can change depending upon the size of the disks and the desired spacing. With disks having a thickness of 0.05 inches, the gap between disks of the same pair can range between 0.025 inches and 0.07 inches. Preferably, the gap is approximately 0.035 inches. The gap spacing between adjacent pairs may also range between 0.085 and 0.130 inches. The preferred spacing is 0.115 inches. Ideally, each disk pair will occupy a space no greater than 0.25 inches with a distance of 0.135 inches measured from R-side to R-side for a gap merge pair of disks.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

As another example, it should be understood that the present invention will work with one disk pair at a time or with a plurality of disk pairs at a time. Thus, a first pair of disks comprising a first and second disk may be substantially simultaneously placed in a container in a gap merge orientation to form a first disk pair, followed by substantially simultaneously positioning a third and fourth disk in the container in a gap merge orientation to form a second disk pair. This sequence may be continued—adding additional disk pairs, until the desired number of disk pairs are positioned in the container. Alternatively, all of the disk pairs may be placed in the container at substantially the same time. A mandrel, or other methods known to those of skill in the art, may be used to position individual disk pairs or pluralities of disk pairs in the container.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing single-sided hard memory disks, the method comprising:
   a. providing a container;
   b. substantially simultaneously positioning a first and second disk in the container adjacent to each other with a first space between them to form a first disk pair;
   c. substantially simultaneously positioning a third and fourth disk in the container adjacent to each other with a second space between them to form a second disk pair;
   d. positioning the second disk pair adjacent to the first disk pair with a third space between the pairs, wherein the third space between the adjacent pairs is larger than the first and second spaces between the disks comprising the first and second disk pairs.

2. The method of claim 1, further comprising sequentially positioning additional disk pairs in the container wherein each pair of disks is substantially simultaneously positioned in the container and the space between pairs of disks is larger than the space between disks comprising each pair.

3. The method of claim 2, further comprising positioning the pairs of disks approximately 0.125 inches apart.

4. The method of claim 2, further comprising positioning the disks of each pair between approximately 0.02 and 0.075 inches apart.

5. The method of claim 4, wherein positioning the disks of each pair approximately 0.02 to 0.075 inches apart comprises positioning the disks of each pair approximately 0.035 inches apart.

6. The method of claim 2, further comprising positioning 23 additional pairs of disks in the container.

7. The method of claim 2, further comprising positioning all pairs of disks adjacent an index mark on the container.

8. The method of claim 1, further comprising positioning the first disk pair adjacent an index mark on the container.

9. A method of manufacturing single-sided hard memory disks, the method comprising:
   a. placing a plurality of disks in a container;
   b. orienting the disks in spaced pairs, with a first space between the two disks comprising each pair and a second space between adjacent pairs of disks, with the first space between disks comprising a pair being less than the second space between adjacent pairs of disks;
   c. removing the disks from the container one pair at a time;
   d. processing the disks in pairs;
   e. returning the disk pairs to the container one pair at a time.

10. The method of claim 9, further comprising maintaining the same orientation of disks in the container following processing.

11. The method of claim 9, further comprising forming a space between disks comprising a pair of between approximately 0.020 and 0.075 inches.

12. The method of claim 9, further comprising forming a space between disks comprising a pair of approximately 0.035 inches.

13. The method of claim 9, further comprising providing at least one index mark on the container.

14. The method of claim 13, further comprising providing the at least one index mark a side wall of the container.

15. The method of claim 9, further comprising providing a plurality of index marks on the container.

16. The method of claim 15, further comprising adjusting the position of the container following return of a disk pair to the container.

17. The method of claim 16, further comprising adjusting the position of the container using at least one index mark.

18. The method of claim 9, further comprising providing an index mark associated with each pair of disks.

19. The method of claim 9, further comprising providing wash slots on the side walls of the container.

* * * * *